United States Patent Office 3,649,578
Patented Mar. 14, 1972

3,649,578
PROCESS FOR PREPARING IONOMERS
John L. Bush, Vienna, W. Va., and Carl William Milligan, Kinston, N.C., assignors to E. I. du Pont de Nemours and Company, Wilmington, Del.
No Drawing. Filed Mar. 25, 1970, Ser. No. 22,692
Int. Cl. C08f *27/04*
U.S. Cl. 260—23 AR                 6 Claims

ABSTRACT OF THE DISCLOSURE

Process for ionically crosslinking first copolymers formed by copolymerizing at least one alpha-olefin of the general formula $RCH=CH_2$ where R is hydrogen or hydrocarbyl having 1 to 8 carbon atoms and at least one alpha,beta-ethylenically unsaturated carboxylic acid having 1 to 2 carboxylic acid groups and 3 to 8 carbon atoms, the alpha-olefin content of the first copolymer comprising at least 50 mole percent of the first copolymer, the alpha,beta-ethylenically unsaturated acid content of said first copolymer comprising 0.2 to 25 mole percent of the first copolymer which comprises mixing the first copolymer with a cation-supplying blend of 20 to 80 percent by weight of substantially water-insoluble metal oxide and/or metal hydroxide and/or metal carbonate, 0 to 10 percent by weight of a lubricant and a complemental amount of a second copolymer with a melt index of 50 to 2000 g./10 min. formed as the first copolymer, at a pressure of 100 to 10,000 p.s.i., at a temperature above the melting point of both the first and second copolymers and between 100° C. and 290° C., with the amount of the cation-supplying blend present being that amount which has sufficient cations to neutralize at least 10% of the carboxylic acid groups in the first and second copolymers and neutralizing at least 10 percent of the carboxylic acid groups in the first and second copolymers.

---

This invention relates to an improved process for producing ionically linked copolymers. Particularly, this invention relates to a process for crosslinking copolymers of alpha-olefins and alpha,beta-ethylenically unsaturated carboxylic acids which comprises mixing the copolymer with a cation-supplying blend containing substantially water-insoluble metal hydroxides and/or oxides and/or carbonates, alpha-olefin/alpha,beta-ethylenically unsaturated carboxylic acid copolymer and optionally a lubricant.

A process for ionically crosslinking copolymers of carboxylic acids and alpha-olefins, i.e., neutralizing some of the carboxylic acid groups with metallic cation-supplying material is disclosed in U.S. Pat. 3,404,134. This process requires a water-soluble cation-supplying material or a water-insoluble cation-supplying material which could be rendered water-soluble by the addition of agents such as acetic acid. If no solubilizing agent is used in the process of U.S. Pat. 3,404,134 when the water-insoluble cation-supplying material is used, the product material will contain white specks and will not be crosslinked effectively. A crosslinked copolymers was sought which (1) had improved properties, which the water-insoluble, cation-supplying material could provide, i.e., less water absorption, etc., (2) did not have obnoxious odors which were present when the water-insoluble cation-supplying material was rendered water-soluble by the use of agents such as acetic acid, and (3) did not contain white specks.

A process has been found which produces ionically crosslinked copolymers with the above sought after properties. Such process is a process for ionically crosslinking at least one first copolymer formed by copolymerizing at least one alpha-olefin of the general formula $RCH=CH_2$ where R is a radical of the class consisting of hydrogen and hydrocarbyl radicals having 1 to 8 carbon atoms and at least one alpha,beta-ethylenically unsaturated carboxylic acid having 1 to 2 carboxylic acid groups and 3 to 8 carbon atoms, the alpha-olefin content of said first copolymer comprising at least 50 mole percent of said first copolymer, the alpha,beta-ethylenically unsaturated carboxylic acid content of said first copolymer comprising 0.2 to 25 mole percent of said first copolymer, which comprises mixing said first copolymer with a cation-supplying blend consisting essentially of 20 to 80 percent by weight of a substantially water-insoluble metal compound selected from the class consisting of metal oxides, metal hydroxides, metal carbonates and mixtures thereof, 0 to 10 percent by weight of a lubricant and a complemental amount of a second copolymer with a melt index of 50 to 2000 g./10 min. formed by copolymerizing at least one alpha-olefin of the general formula $RCH=CH_2$ where R is a radical of the class consisting of hydrogen and hydrocarbyl radicals having 1 to 8 carbon atoms and at least one alpha,beta-ethylenically unsaturated carboxylic acid having 1 to 2 carboxylic acid groups and 3 to 8 carbon atoms, the alpha-olefin content of said second copolymer comprising at least 50 mole percent of said second copolymer, the alpha,beta-ethylenically unsaturated carboxylic acid content of said second copolymer comprising 0.2 to 25 mole percent of said second copolymer. at a pressure of 100 to 10,000 p.s.i. and at a temperature above the melting point of both the first and second copolymers and between 100° C. and 290° C., with the amount of the cation-supplying blend present being that amount which has sufficient cations to neutralize at least 10% of the carboxylic acid groups in the first and second copolymers and neutralizing at least 10% of the carboxylic acid groups in the first and second copolymers.

"Consisting essentially of" as it is used throughout the specification and claims is meant to not exclude conditions or materials which do not prevent the advantages of the invention from being realized. "Complemental amount" as used throughout the specification and claims is not meant to detract from the aforesaid definition of "consisting essentially of."

The process of this invention can be run in different types of equipment such as in extractor-extruders and Banbury mixers. Usually the process will be carried out in an extractor-extruder. The process can include the additional step of adding water to the combination of the first copolymer and the cation-supplying blend before or during mixing.

The preferred concentration of alpha-olefin polymerized units in the first and second copolymers is at least 80 mole percent and the preferred concentration of alpha,beta-ethylenically unsaturated carboxylic acid polymerized units in the first and second copolymers is 1 to 10 mole percent. The preferred melt index for the second copolymer is 100 to 1000 grams per 10 minutes while the melt index of the first copolymer is usually from 0.1 to 1000 grams per 10 minutes. Melt index as used throughout is measured according to ASTM–D–1238–65T. The reason for the lower limit on the melt index range for the second copolymer is that the cation-supplying blend will not have sufficient melt flow to be useful if the second copolymer used has a lower than 50 g./10 min. melt index and is partially cross-linked when the cation-supplying blend is prepared.

Specific alpha-olefin polymerized units useful in the first and second copolymers include ethylene, propylene, butene-1, styrene, pentene-1, hexene-1, heptene-1,3-methyl-butene-1, and 4-methylbutene-1. Specific alpha,beta-ethylenically unsaturated carboxylic acid polymerized units useful in the first and second copolymers include: acrylic, methacrylic, ethacrylic, itaconic, maleic, fumaric, monoesters of dicarboxylic acids such as ethyl hydrogen fumarate and maleic anhydride. Maleic anhydride and other alpha,beta-ethylenically unsaturated anhydrides are considered acids for the purposes of the present invention.

The preferred process for preparing the first and second copolymers for use in the process of this invention is copolymerization. This may be achieved by introducing the monomers into a polymerization environment maintained at high pressures 50 to 3000 atmospheres, and at elevated temperatures, 150 to 300° C., together with a free radical polymerization catalyst. An inert solvent such as water or benzene may be employed in the polymerization environment. Random distribution of carboxylic acid groups on all the polymer molecules is best obtained by direct copolymerization. Particular processes for production of the copolymers are known in the art and described in the literature.

The first and second copolymers may also be obtained by grafting an alpha-beta-ethylenically unsaturated carboxylic acid to a polyolefin base or by conversion of a copolymer of a polyolefin and a derivative of carboxylic acid to the free acid.

The cation-supplying blend is preferably 30 to 70 percent by weight of the substantially water-insoluble metal compound, 0.2 to 2 percent by weight of the lubricant with the balance being the second copolymer. The preferred water-insoluble metal compounds are zinc oxide, zinc hydroxide, calcium oxide, calcium hydroxide, magnesium oxide, magnesium hydroxide, and mixtures of these. The normally used lubricants are stearic acid, oleic acid, erucic acid, linoleic acid, palmitic acid and metal salts of these acids, such as zinc stearate, etc.

The cation-supplying blend can be prepared by mixing the components on a roll mill or in a Banbury mixer at a temperature above the crystalline melting point of the second copolymer. Other well-known blending techniques may also be utilized.

The first and second copolymers need not be two-component polymers. Thus, although the olefin content of the copolymers should be at least 50 mole percent, more than one olefin can be employed to provide the hydrocarbon nature of the copolymer. Also, more than one alpha,beta-ethylenically unsaturated carboxylic acid may be employed. Additionally, any third copolymerizable monomer can be employed in combination with the olefin and the carboxylic acid comonomer. Preferred termonomers are some of the vinyl esters and acrylates such as alkyl acrylates and methacrylates having up to 8 carbon atoms; for instance, methyl methacrylate and ethyl acrylate. The scope for the first and second copolymers suitable for use in the present invention is illustrated by the following examples: ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate copolymers, ethylene/methacrylic acid/methyl methacrylate copolymers, ethylene/itaconic acid/methyl methacrylate copolymers, ethylene/methyl hydrogen maleate/ethyl acrylate copolymers, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/chlorotrifluoroethylene/methacrylic acid copolymers, ethylene/methacrylic acid/acrylic acid copolymers, and ethylene/methacrylic acid/maleic anhydride copolymers.

The copolymers may also, after polymerization, but prior to ionic crosslinking, be further modified by various reactions to result in polymer modifications which do not interfere with the crosslinking. Halogenation of the copolymer is an example.

Blends of the alpha-olefin/alpha,beta-ethylenically unsaturated carboxylic acid copolymer with other alpha-olefin/alpha, beta-ethylenically unsaturated copolymers or with other hydrocarbon polymers may be crosslinked by the process of this invention.

As used throughout the specification and claims, substantially water-insoluble metal compounds are meant to refer to metal compounds which have a solubility of less than 1 gram per hundred milliliters of water at room temperature, i.e., about 20° C. The process can be carried out with water-soluble metal compounds such as those utilized in U.S. Pat. 3,404,134. However, there is no substantial benefit in using this process with the water-soluble metal compounds over the process disclosed in U.S. Pat. 3,404,134.

The quantity of the cation-supplying blend which is utilized will depend on the degree of crosslinking required to obtain the degree of solid property change and degree of melt property change desired. In general, it was found that the concentration of the cation-supplying blend utilized should be at least that amount which has enough cations to neutralize at least 10% of the carboxylic acid groups in the first and second copolymers if a significant change of properties is to be obtained. Usually, it is desirable to neutralize 10 to 60% of the acid groups.

The process can be run in batch form or as a continuous process. The preferred pressure for the process is 1000 to 4000 p.s.i. while the preferred temperature for the process is 200 to 270° C.

The crosslinked copolymer obtained from the process of this invention is useful in films and foams for insulation.

The following examples are to illustrate but not to limit the invention. All percentages and parts are by weight unless otherwise specified. Throughout the examples, flexural modulus is measured according to ASTM–D–790–66 and percent haze is measured according to ASTM–D–1003–61 Procedure A.

EXAMPLE I

To the feed opening of a 3.5-inch diameter plasticating extruder was fed a dry blend of pellets of ethylene/methacrylic acid copolymer and pellets of the cation-supplying blend defined in Table I in the amount defined in Table I. The feed rate of the blend was about 80 lbs./hr. In the extruder, the plastic pellets were melted and conveyed along with the cation-supplying blend to the mixing section. The initial plasticating section of the screw was 7-diameters long and was maintained at a temperature of about 140° C. At the inlet of the mixing section, water was injected into the molten stock by means of a nozzle penetrating the barrel wall in samples 2, 3, and 4. The mixing section was of the type described in U.S. Pat. 3,006,029 and was 13-diameters long. In the mixing section, maintained at a temperature of 250 to 260° C., the cation-supplying blend reacted with the polymer melt to neutralize the acid groups of the polymer.

At the end of the mixing section, the mixture of ion linked copolymer and reaction by-products passed through a pressure control valve and a transfer line into a 2-inch diameter extraction extruder. The stock temperature before the valve was 265° C. and the pressure 1500 p.s.i. This extruder had 2 extraction zones, each about 4-diameters in length, in series. The first extraction zone was maintained at 27 in. of mercury and the second at 28 in. of mercury. The temperature of the melt was maintained at 250 to 260° C. The extraction zone removed the volatile constituents from the molten, ion linked copolymer. The polymer was extruded through a die in the form of strands, cooled in water and cut into pellets. Sample 5 was run as a comparison and utilized zinc oxide alone instead of the cation-supplying blend. Table I indicates the materials used in the process for each sample and the properties of the sample products.

unsaturated carboxylic acid, having 1 to 2 carboxylic acid groups and 3 to 8 carbon atoms, the alpha-olefin content of said second copolymer comprising at least 50 mole percent of said second copolymer, the alpha,beta-ethylenically unsaturated carboxylic acid content of said second copolymer comprising from 0.2 to 25 mole percent of said second copolymer, at a pressure of 100 to 10,000 p.s.i. and at a temperature above the melting point of both the first and second copolymers and between 100° C. and 290° C., with the amount of the cation-supplying blend present being that amount which has sufficient cations to

TABLE I

| | Ethylene/methacrylic acid copolymer | | | | | Water, wt. percent based on ethylene/ methacrylic acid copolymer | Product | | |
|---|---|---|---|---|---|---|---|---|---|
| | Weight percent | | | | Cation- supplying blend,[1] wt. percent used | | | | |
| Sample | Methacrylic acid | Ethylene | Melt index, g./10 min. | Flexural modulus, p.s.i. | | | Melt index, g./10 min. | Percent haze 80 mil plaque | Remarks |
| 1 | 15 | 85 | 60.0 | 12,250 | 7.5 | 0.0 | 0.98 | 3.0 | No white specks. |
| 2 | 15 | 85 | 60.0 | 12,250 | 7.5 | 4.0 | 0.70 | 3.3 | Do. |
| 3 | 15 | 85 | 60.0 | 12,250 | 7.5 | 5.4 | 0.85 | 5.7 | Do. |
| 4 | 15 | 85 | 60.0 | 12,250 | 7.5 | 5.4 | 0.96 | 4.0 | Do. |
| 5 | 15 | 85 | 60.0 | 12,250 | [2] 7.5 | 7.0 | No reaction-contaminated with unreacted zinc oxide | | |

[1] 60 weight percent, zinc oxide; 0.6 weight percent, zinc stearate; 39.4 weight percent, ethylene/methacrylic acid copolymer [3] (melt index=500 g./10 min.).
[2] Zinc oxide powder.
[3] 90 weight percent ethylene and 10 weight percent methacrylic acid.

EXAMPLE II

Following the procedure of Example I, pellets of a copolymer of ethylene and methacrylic acid and pellets of the cation-supplying blend described in Table II were fed to a plasticating extruder as separate streams. At the inlet of the mixing section, water was injected into the molten resin. The melt temperature at this point was 225° C. and the pressure was 2000 p.s.i. The mixture was allowed to react in the mixing section, after which the molten mixture at a temperature of 215° C. was passed over a throttle ring into the extraction zone. The melt was devolatilized under a vacuum of 25 inches of mercury. Subsequently, the dried, molten, ion linked resin was extruded as a strand, cooled in water and cut into pellets. The feed materials and physical properties of the feed materials as well as the product are indicated in Table II.

neutralize at least 10 percent of the carboxylic acid groups in the first and second copolymers and neutralizing at least 10 percent of the carboxylic acid groups in the first and second copolymers.

2. The process of claim 1 wherein the metal compound is selected from a class consisting of zinc oxide, zinc hydroxide, calcium oxide, calcium hydroxide, magnesium oxide, magnesium hydroxide, and the mixtures thereof and the lubricant is selected from the class consisting of stearic acid, oleic acid, erucic acid, linoleic acid, palmitic acid, and metal salts thereof.

3. The process of claim 2 wherein the cation-supplying blend contains 30 to 70 percent by weight of the metal compound, 0.2 to 2 percent by weight of the lubricant, and a complemental amount of the second copolymer.

4. The process of claim 3 wherein 10 to 60 percent of

TABLE II

| | Ethylene/methacrylic acid copolymer | | | | | Water, wt. percent based on ethylene/ methacrylic acid copolymer | Product | |
|---|---|---|---|---|---|---|---|---|
| | Weight percent | | | | Cation- supplying blend,[1] wt. percent | | | |
| Sample | Methacrylic acid | Ethylene | Melt index, g./10 min. | Flexural modulus, p.s.i. | | | Melt index, g./10 min. | Flexural modulus, p.s.i. |
| 1 | 10 | 90 | 35 | 12,000 | 7.0 | 5.0 | 1.60 | |
| 2 | 10 | 90 | 35 | 12,000 | 7.0 | 5.0 | 1.30 | |
| 3 | 15 | 85 | 60 | 12,250 | 7.5 | 5.0 | 1.10 | 44,630 |

[1] 60 wt. percent zinc oxide; 40 wt. percent ethylene/methacrylic acid copolymer [2] (melt index=500 g./10 min.).
[2] 90 wt. percent ethylene and 10 wt. percent methacrylic acid.

We claim:

1. A process for ionically crosslinking at least one first copolymer formed by copolymerizing at least one alpha-olefin of the general formula $RCH=CH_2$ where R is a radical of the class consisting of hydrogen and hydrocarbyl radicals having 1 to 8 carbon atoms and at least one alpha,beta-ethylenically unsaturated carboxylic acid having 1 to 2 carboxylic acid groups and 3 to 8 carbon atoms, the alpha-olefin content of said first copolymer comprising at least 50 mole percent of said first copolymer, the alpha-beta-ethylenically unsaturated carboxylic acid content of said first copolymer comprising 0.2 to 25 mole percent of said first copolymer, which comprises mixing said first copolymer with a cation-supplying blend consisting essentially of 20 to 80 percent by weight of a substantially water-insoluble metal compound selected from the class consisting of metal hydroxide, metal carbonate and mixtures thereof, 0 to 10 percent by weight of a lubricant and a complemental amount of a second copolymer with a melt index of 50 to 2000 g./10 min. formed by copolymerizing at least one alpha-olefin of the general formula $RCH=CH_2$ where R is a radical of the class consisting of hydrogen and hydrocarbyl radicals having 1 to 8 carbon atoms and at least one alpha,beta-ethylenically the carboxylic acid groups of the first and second copolymers are neutralized.

5. The process of claim 4 wherein the alpha-olefin content of the first and second copolymers is at least 80 mole percent and wherein the alpha,beta-ethylenically unsaturated carboxylic acid content of the first and second copolymers is 1 to 10 mole percent.

6. The process of claim 5 wherein the pressure is 1000 to 4000 p.s.i. and the temperature is 200 to 270° C.

References Cited

UNITED STATES PATENTS

| 3,404,134 | 10/1968 | Rees | 260—78.5 |
| 3,365,520 | 1/1968 | Foster et al. | 260—897 |
| 3,264,272 | 8/1966 | Rees | 260—78.5 |
| 3,347,957 | 10/1967 | Adomaitis et al. | 260—897 |
| 3,437,718 | 4/1969 | Rees | 260—897 X |

DONALD E. CZAJA, Primary Examiner

D. J. BARRACK, Assistant Examiner

U.S. Cl. X.R.

260—23 H, 78.5 BB, 897 B

PO-1050
(5/69)

UNITED STATES PATENT OFFICE
CERTIFICATE OF CORRECTION

Patent No. 3,649,578       Dated March 14, 1972

Inventor(s) JOHN LORYMER BUSH and CARL WILLIAM MILLIGAN

It is certified that error appears in the above-identified patent and that said Letters Patent are hereby corrected as shown below:

Claim 1, column 5, line 68, after "consisting of" insert -- metal oxide, --.

Signed and sealed this 17th day of October 1972.

(SEAL)
Attest:

EDWARD M. FLETCHER, JR.
Attesting Officer

ROBERT GOTTSCHALK
Commissioner of Patents